Aug. 18, 1953     S. C. WINGER     2,649,176
SELECTIVE ONE-WAY DRIVE
Filed June 20, 1949
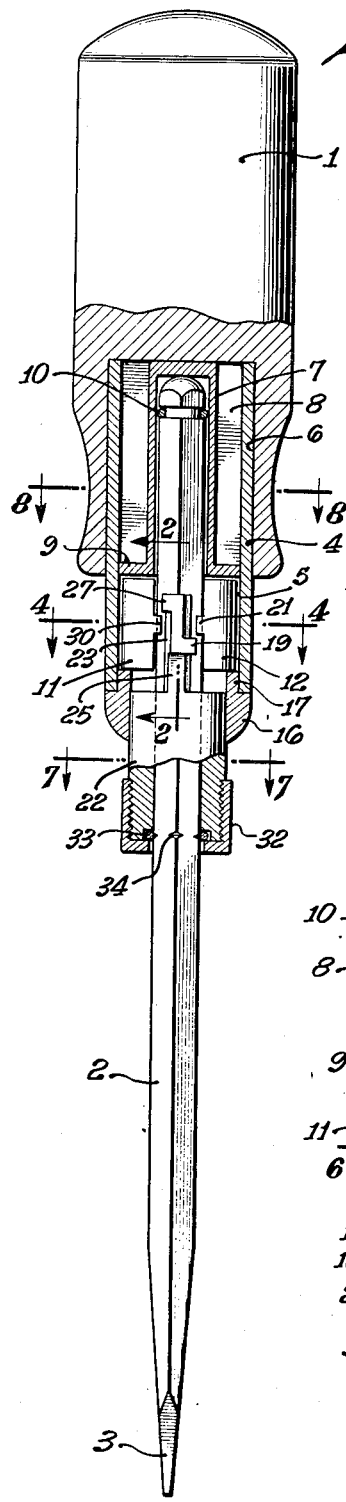
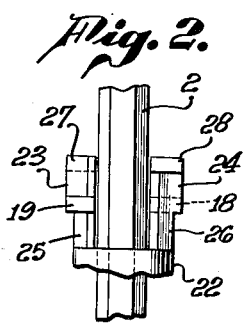
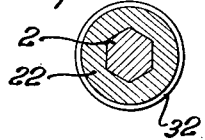
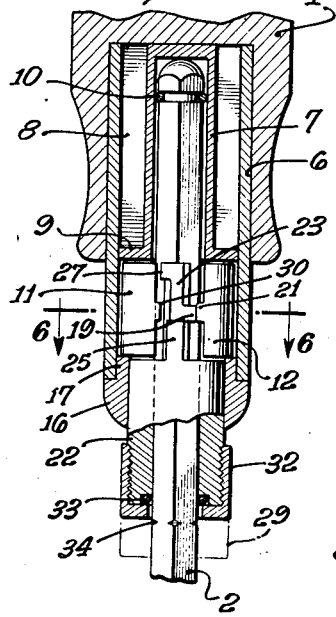
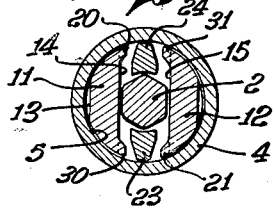
INVENTOR.
STOVER C. WINGER,
BY John Flam
ATTORNEY.

Patented Aug. 18, 1953

2,649,176

UNITED STATES PATENT OFFICE 2,649,176

SELECTIVE ONE-WAY DRIVE

Stover C. Winger, Los Angeles, Calif., assignor of fifteen per cent to John Flam, Beverly Hills, Calif.

Application June 20, 1949, Serial No. 100,239

5 Claims. (Cl. 192—43)

This invention relates to tools, and particularly to screw drivers.

Screw drivers have been made in the past, that obviate removal of the blade from the slot of the screw after the screw is turned through an angle. For example, a pawl and ratchet drive may be interposed between the handle and the blade, so that the blade may be kept in contact with the screw slot continuously; the handle is merely given alternate reverse and forward angular movement.

It is one of the objects of this invention to provide a simplified screw driver, operating in this fashion.

It is another object of this invention to provide a simple and effective clutch between a driving member (as for example the handle of a screw driver) and a driven member (as for example the blade of a screw driver). In its broadest aspects, such a clutch incorporating the invention is useful in many types of mechanism where rotary power is to be transmitted selectively or optionally in either direction of movement.

It is still another object of the invention to provide a clutch mechanism that may be optionally adjusted in a simple manner to drive in either direction.

It is still another object of this invention to simplify a structure of this character, and to facilitate assembly of the operating parts.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a view, partly in section, of a screw driver incorporating the invention, the handle and shank being shortened in order to reduce the size of the figure;

Figs. 2, 4, 7 and 8 are sectional views, taken along planes corresponding to lines 2—2, 4—4, 7—7 and 8—8 of Fig. 1;

Fig. 3 is a fragmentary view, similar to Fig. 1, illustrating an alternative position of the drive mechanism;

Fig. 5 is a view similar to Fig. 4 illustrating the manner in which a drive is effected between the handle and the shank;

Fig. 6 is a sectional view, taken along a plane corresponding to line 6—6 of Fig. 3.

The screw driver includes a handle 1, which may be made of wood, plastic, or other suitable material, and a shank or shaft 2. The shank 2 terminates in a flattened blade 3 that may be inserted into a slot in the head of the screw to be driven.

A clutch mechanism is interposed between the handle 1 and the shank 2 in order to make it possible to drive the shank 2 in either direction upon reciprocatory angular motion of the handle 1. One element of this clutch is provided by an annular member 4 in the form of a metallic tube. The tube 4 is rigidly fastened into the cylindrical recess 6 formed in one end of the handle 1. It projects considerably below the handle 1 to form the internal cylindrical clutching surface 5. The upper end of the shank 2 is free to rotate with respect to the handle 1. For this purpose it is inserted within the hollow cylindrical socket member 7 (see, also, Fig. 8). Externally of cylindrical member 7 a plurality of radial webs or vanes 8 are integrally formed. The ends of the radial vanes are pressed into the annular member 4. At the lower end of the member 7 there is a flange 9 which covers the annular space between the socket 7 and the annular member 4.

The shank 2 is shown in this instance as formed of hexagonal stock. Its cross section thus presents parallel plane faces. It is removably retained within the socket member 7 by friction, as by providing an expanding spring ring 10 in a groove formed near the upper end of the shank 2. Furthermore, as clearly shown in Fig. 8, the diagonal of the hexagonally shaped cross section of the shank 2 corresponds substantially with the internal diameter of the member 7, so that there is no restraint against relative angular movement between the shank 2 and the handle 1.

In order to drive the shank 2 by the aid of the handle 1, use is made of a pair of clutch segments 11 and 12, cooperating with annular member 4. These segments may have flattened tops, as indicated at 13, and have cylindrical surfaces adapted frictionally to engage the internal surface 5. As shown most clearly in Fig. 4, the opposite parallel faces of the shank 2 are received between the plane surfaces 14 and 15 of the segments 11 and 12. Furthermore, at this place the corners of the hexagon are slightly rounded. There is only a small amount of clearance (of about one or two one-thousandths of an inch) between the parallel faces of the shank 2 and the contiguous faces of the segments 11 and 12.

The segments 11 and 12 may be expanded, or urged apart, into frictional engagement with the internal surface 5 by rotation of the handle in either direction. Thus, for example, the rotation of the handle in a counterclockwise direction, as viewed in Fig. 5, causes opposite corners of the hexagonal shank 2 to engage the plane surfaces of the segments 11 and 12 and to wedge them apart into firm frictional engagement with the internal surfaces 5.

Accordingly, as thus far described, a slight angular movement of the handle 1 and its attached annular member 4 serves to cause wedging of the segments 11 and 12 into driving relation with the shank 2, and the shank 2 is correspondingly rotated. This occurs for either direction of rotation of the handle 1.

In order to confine the segments 11 and 12 against substantial axial movement, use is made of a bushing member 16. This bushing member 16 has a flange 17 telescoping into the annular member 4, and retained therein, as by friction. The segments 11 and 12 are confined between the lower surface of flange 9 and the upper surface of flange 17.

In order to make it possible to reverse the angular motion of the handle 1 without rotating the shank 2, means are provided for restraining relative angular movement between the shank 2 and the segments 11 and 12 during reverse rotation. In Fig. 6, a restraining means is shown as interposed between the segments 11 and 12 to prevent angular movement of the segments 11 and 12 in a clockwise direction. Thus, a pair of abutments 18 and 19 are shown, which cooperate with the short projections 20 and 21 carried by the segments 11 and 12. These abutments 18 and 19 may be considered, for the present as fixed. They are in such angular relationship with respect to the segments 11 and 12 that the plane surfaces 14 and 15 are kept substantially parallel with the opposed parallel plane surfaces of shank 2. Accordingly, engagement of the abutments 18 and 19, respectively, with the projections 20 and 21 will prevent movement of the segments 11 and 12 into driving relationship with the shank 2 when the annular member 4 is moved in a clockwise direction.

No such restraint is imposed upon movement of the segments 11 and 12 in a counter-clockwise direction. Accordingly, if shank 2 is stationary, the angular movement of the annular member 4 in a counter-clockwise direction serves to move segments 11 and 12 by friction into engagement with opposite corners of the shank 2, and coupling is therefore effected between the handle 1 and the shank 2. The handle 1 can then be rotated in a counter-clockwise direction for rotating the shank 2. The handle, however, is free to rotate in a clockwise direction.

In order to make it possible to reverse the direction of the drive, the abutments 18 and 19 are carried on a slide movable along shank 2 which slide carries another set of abutments axially spaced from the abutments 18 and 19.

Thus, splined to the shank 2 is a slide 22. This slide, as shown most clearly in Figs. 1, 3 and 7, is guided for movement in the bushing member 16. It is provided with a hexagonal aperture permitting it to be adjusted axially with respect to the shank 2, while relative rotation between the slide and the shank is prevented.

The slide 22 carries diametrically opposite projections 23 and 24. These projections are joined integrally to the slide 22 by the connecting members 25 and 26. As shown most clearly in Figs. 4, 5 and 6, the projections 23 and 24 enter between the segments 11 and 12. The projections 23 and 24 extend generally in an axial direction, and carry at opposite ends thereof the pairs of sets of abutments 18 and 19 (appearing at the lower end of the projections 23), and the abutments 27 and 28 (extending from the upper end of the projections 23 and 24). The abutments 19 and 27, as shown most clearly in Figs. 1 and 2, face in opposite directions from the projection 23, forming a substantially Z-shaped member. Similarly, the abutments 18 and 28 extend in opposite direction of the projections 24.

The slide 22 is shown in adjusted position in Fig. 1, in which neither of the sets of abutments 18—19 or 27—28 is effective to restrain relative angular movement of the segments 11 and 12. Accordingly, the screw driver may be operated as an ordinary screw driver, the handle 1 being in continual driving relation with the shank 2 for either direction of rotation (see Fig. 4).

In Fig. 3, the slide 22 has been moved to its extreme upper position. This upward movement is limited by the contact of the abutments 27 and 28 with the lower surface of flange 9. In this position, the abutments 18 and 19 contact the projections 20 and 21 of the segments 11 and 12. Accordingly, the handle 1 is coupled to the shank 2 only during counter-clockwise rotation of handle 1 (see Fig. 6).

Now, assume that the slide 22 is moved to its extreme lowermost position, as indicated by the dotted lines 29 in Fig. 3. Under such circumstances, the abutments 27 and 28 cooperate with the projections 30 and 31 of the segments 11 and 12. Obviously, this would cause coupling of the handle 1 to the shank 2 only for clockwise direction of rotation.

The amount of angular rotation necessary to cause expansion of the segments 11 and 12 is quite small. This small relative rotation is secured by providing relatively close limits of clearances between the annular member 4, the segments 11 and 12, and the shank 2.

The slide 22 has a cap 32 threaded exteriorly over the lower end of the slide 22. This cap serves to confine a contracting spring ring 33 in a recess formed in the lower end of the slide 22. This spring ring is intended to engage an interrupted groove 34 provided on the shank 2. When the ring 33 is in the groove 34 (Fig. 1), the screw driver handle 1 is continuously coupled to the shank 2. The slight resistance to movement of the slide 22, provided by the spring ring 33, is sufficient to indicate to the user when this particular setting is effected. No such indication is required for the other two positions of the slide. The slide 22 is limited, as heretofore stated, in its upward movement by contact of the abutments 27 and 28 with the lower surface of flange 9. Similarly, the abutments 18 and 19 serve as a stop against the flange 17 when the slide 22 is moved downwardly.

The screw driver can be very simply assembled and taken apart. There is merely a frictional restraint against withdrawal of the shank 2 from the handle 1. This restraint is provided by the contact of the expanding spring ring 10 and the interior of the cylindrical member 7. First of all, the bushing 16 may be removed from the annular member 4, since these two parts are held together frictionally. The segments 11 and 12 are then readily removable at the same time that the shank 2 is pulled out of the cylindrical member 7. The reverse process of assembling the parts is apparent.

The inventor claims:

1. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; and means slidable along the shaft and non-rotary with respect thereto, for selectively restraining relative angular movement between the shank and each of the segments in either of the two directions of relative movement, including a pair of sets of abutments, each set providing a simultaneous restraint for each segment.

2. In a clutch mechanism: a shaft having angularly spaced flat surfaces; means providing a recess in to which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; and means slidable along the shaft, and non-rotary with respect thereto, for optionally preventing engagement of the flat and plane surface, including a pair of sets of abutments, each set providing a simultaneous restraint for each segment.

3. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; and means slidable along the shaft and non-rotary with respect thereto, for selectively restraining relative angular movement between the shank and each of the segments in either of the two directions of relative movement, comprising two sets of axially spaced abutments for selectively preventing relative rotation in either direction, each set providing a simultaneous restraint for each segment.

4. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; and means slidable along the shaft, and non-rotary with respect thereto, for selectively restraining relative angular movement between the shank and each of the segments in either of the two directions of relative movement, comprising two sets of axially spaced abutments for selectively preventing relative rotation in either direction, each set providing a simultaneous restraint for each segment, there being sufficient axial spacing between the two sets to permit intermediate positioning of the slidable member to cause wedging for both directions of relative rotation.

5. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; and means slidable along the shaft, and non-rotary with respect thereto, for selectively restraining relative angular movement between the shank and each of the segments in either of the two directions of relative movement, comprising two sets of axially spaced abutments; one set restraining relative angular movement between the segments and the shaft in one direction, and the other set restraining relative angular movement between the segments and the shaft in the other direction, each set providing a simultaneous restraint for each segment, said slidable member being positionable to cause either or neither of the sets to be active.

STOVER C. WINGER.

References Cited in the file of this patent

UNITED STATES PATENTS

| Number | Name | Date |
| --- | --- | --- |
| 333,143 | McDonald | Dec. 29, 1885 |
| 849,487 | Morse | Apr. 9, 1907 |
| 1,158,765 | Aiken | Nov. 2, 1915 |
| 2,299,739 | Colucci | Oct. 27, 1942 |
| 2,463,220 | Van Hoose | Mar. 1, 1949 |
| 2,463,221 | Van Hoose | Mar. 1, 1949 |